US012650031B2

(12) United States Patent
Derham

(10) Patent No.: US 12,650,031 B2
(45) Date of Patent: Jun. 9, 2026

(54) DOOR LOCK ASSEMBLY

(71) Applicant: Mighton Products Limited, Saffron Walden (GB)

(72) Inventor: Michael Derham, Saffron Walden (GB)

(73) Assignee: Mighton Products Limited, Saffron Walden (GB)

( * ) Notice: Subject to any disclaimer, the term of this patent is extended or adjusted under 35 U.S.C. 154(b) by 106 days.

(21) Appl. No.: 18/493,964

(22) Filed: Oct. 25, 2023

(65) Prior Publication Data

US 2024/0141694 A1 May 2, 2024

(30) Foreign Application Priority Data

Oct. 31, 2022 (GB) ...................................... 2216070

(51) Int. Cl.
*E05B 49/00* (2006.01)
*E05B 63/00* (2006.01)

(52) U.S. Cl.
CPC .......... *E05B 49/00* (2013.01); *E05B 63/0017* (2013.01)

(58) Field of Classification Search
CPC .. E05B 49/00; E05B 63/0017; Y10T 70/5341; Y10T 70/7051; Y10T 70/7068
USPC ........................................................... 70/129
See application file for complete search history.

(56) References Cited

U.S. PATENT DOCUMENTS

| | | | | |
|---|---|---|---|---|
| 4,901,545 | A | 2/1990 | Bacon et al. | |
| 2003/0132829 | A1* | 7/2003 | Frolov | G07C 9/0069 340/5.7 |
| 2017/0096838 | A1 | 4/2017 | Gartner | |
| 2018/0320412 | A1 | 11/2018 | Matosian | |

FOREIGN PATENT DOCUMENTS

| | | | | |
|---|---|---|---|---|
| CA | 2401782 | A1 * | 8/2001 | G01N 21/6428 |
| JP | 2004529323 | A * | 9/2004 | G01N 33/54373 |
| WO | WO-2005059551 | A2 * | 6/2005 | G01N 33/54313 |
| WO | WO-2006098690 | A1 * | 9/2006 | G07C 9/00309 |
| WO | WO-2019169119 | A1 * | 9/2019 | E05B 49/00 |

* cited by examiner

*Primary Examiner* — Suzanne L Barrett
(74) *Attorney, Agent, or Firm* — Brown & Brown IP Law PLLC

(57) ABSTRACT

A door lock assembly for operating an electronic door lock module to lock and unlock a door. The door lock assembly comprises a housing extending along a central longitudinal axis from a first end to a second end, the housing comprising a peripheral wall which extends from the first end to the second end and is radially spaced around the central longitudinal axis. An interface is configured to connect the door lock assembly to the electronic door lock module for operating a lock bolt. A primary locking arrangement for locking and unlocking the door comprises a keypad for inputting information to operate the electronic door lock, and the door lock assembly comprises a secondary locking arrangement for locking and unlocking the door. At least a portion of the peripheral wall is arcuate and curves around the central longitudinal axis of the housing, and the keypad is provided on the peripheral wall and curves around the central longitudinal axis of the housing.

27 Claims, 11 Drawing Sheets

DOOR LOCK ASSEMBLY

FIELD OF THE INVENTION

The present invention relates to a door lock assembly for use with an electronic door lock, a door comprising a door lock assembly and an electronic door lock, and a method of installing a door lock assembly on a door.

BACKGROUND TO THE INVENTION

A door lock generally includes a lock bolt mounted on the edge of the door which is moved into and out of engagement with a locking recess provided in a door frame. Typically, a rotary locking spindle is arranged to be turned in order to move the locking bolt. This rotary locking spindle may be turned externally by a key or internally through the use of a thumb turn.

A lock mechanism for operating the lock bolt, such as a key lock mechanism, may be mounted in a recess or bore in the door. In some cases, the lock mechanism may protrude from a side of the door, in which case the lock mechanism may be disposed in a housing mounted to the door. The housing protects the lock mechanism and also hides the lock mechanism to improve the appearance of the door.

Electronic door locks may be arranged to incorporate a motor or solenoid to move the lock bolt into and out of a locked position. These may comprise a simple motor which is powered to move the locking bolt into the locked position. The motor may then be operated in reverse to retract the bolt. The lock bolt of such motorised locks should be able to be operated independently using either the key/thumb turn or the motor.

Some electronic door locks may comprise one or more different security devices or systems, such as a RFID card reader, keypad, fingerprint sensor, or a voice or face recognition system. Generally, such security devices are mounted on a plate, or provided in an additional housing (which may be connected to the housing of the electronic door lock) mounted externally on the door, which may be bulky or give an undesirable appearance to the door.

It is an aim of the present invention to overcome at least one problem associated with the prior art whether referred to herein or otherwise.

SUMMARY OF THE INVENTION

According to a first aspect of the present invention there is provided a door lock assembly for operating an electronic door lock module to lock and unlock a door, the door lock assembly comprising:

- a housing extending along a central longitudinal axis from a first end to a second end, the housing comprising a peripheral wall which extends from the first end to the second end and is radially spaced around the central longitudinal axis;
- an interface configured to connect the door lock assembly to the electronic door lock module for operating a lock bolt;
- a primary locking arrangement for locking and unlocking the door, the primary locking arrangement comprising a keypad for inputting information to operate the electronic door lock, and
- a secondary locking arrangement for locking and unlocking the door,
- wherein at least a portion of the peripheral wall is arcuate and curves around the central longitudinal axis of the housing, and
- wherein the keypad is provided on the peripheral wall and curves around the central longitudinal axis of the housing.

Preferably the keypad is provided on an upper side of the housing.

Preferably the keypad faces generally upward in use.

Preferably the keypad extends around a part of a circumference of the peripheral wall. The keypad may be arranged to extend around an upper part of the circumference of the peripheral wall.

Preferably the arcuate portion of the peripheral wall comprises an arcuate surface which curves around the central longitudinal axis.

Preferably a plane of the keypad is curved around the central longitudinal axis.

Preferably a plane of the keypad is coextensive with at least part of the arcuate surface of the housing.

Preferably keys of the keypad are actuated in a direction radially with respect to the longitudinal axis.

Preferably the keypad comprises a plurality of keys which may be arranged to extend radially around the central longitudinal axis. The plurality of keys may comprise discrete/individual keys. The keys may be arranged in two rows of keys. The first row of keys may locate closer to the first end of the housing relative to the second row of keys.

The housing may have a generally frustoconical shape. The housing may comprise a frustoconical housing. The frustoconical housing may extend from the first end to the second end wherein the first end has a larger diameter relative to the second end. The frustoconical housing may flare outwardly away from the central longitudinal axis in a direction from the second end to the first end.

Preferably the first end of the housing is arranged, in use, to locate adjacent to a surface of a door. Preferably the first end of the housing is arranged, in use, to locate adjacent to an external surface of the door. Preferably the second end is arranged, is use, to locate spaced from the door. The housing may be arranged, in use, to protrude away from the door. The protruding housing may enable a user to place a palm of their hand over the second end and for their fingers to operate the key pad.

The secondary locking arrangement may be arranged to lock or unlock the door by operating the electronic locking mechanism, and/or by mechanically actuating the lock bolt. The secondary locking arrangement may lock or unlock the door solely by mechanical means (e.g. without operating the electronic locking mechanism).

Preferably the secondary locking arrangement comprises a mechanical locking mechanism, preferably a key lock mechanism. The secondary locking arrangement may comprise a cylinder lock.

The secondary locking arrangement may comprise an electronic locking arrangement such as a RFID card reader, fingerprint sensor, and/or a voice or face recognition system.

Preferably the door lock assembly comprises a cylinder lock comprising a lock bolt which is extendable and retractable. The door lock assembly may comprise a cylinder lock comprising the lock bolt which is extendable and retractable between a locked position and an unlocked position.

The door lock assembly may comprise a rotary locking spindle. Preferably rotation of the rotary locking spindle is arranged to move the lock bolt translationally between the locked position and the unlocked position. The electronic door lock may engage with and rotate the rotary locking spindle.

The lock assembly may comprise an antenna assembly. The antenna assembly may comprise a Bluetooth antenna assembly. The antenna assembly may comprise a flying lead. The antenna assembly may comprise an antenna disposed at a distal end of the flying lead. A proximal end of the flying lead may comprise an electrical connector. The flying lead may comprise a flexible cable. The flying lead may comprise a coaxial cable. Preferably the flying lead extends between a control module of the lock assembly and the Bluetooth antenna.

The proximal end of the antenna assembly may be fixed with respect to the housing. Preferably, a distal end of the Bluetooth antenna assembly comprising the Bluetooth antenna is moveable with respect to the housing to enable the Bluetooth antenna to be located outside the housing. The distal end of the antenna assembly may comprise a free end of the antenna assembly moveable with respect to the housing. In this way the antenna may be tethered to the housing.

The flying lead may be arranged to extend through an opening in a door. The proximal end of the flying lead may be located on first side (for example an external side of the door exterior to a building or room) and the antenna may be located on a second side of the door (for example an internal side of the door facing the interior of a building or room).

The door lock assembly may comprise a mounting plate arranged to locate between the door and the electronic door lock in use. The mounting plate may be arranged to locate on an opposite side of the door to the lock assembly in use. The mounting plate may comprise an aperture for receiving the rotary locking spindle therethrough.

Preferably the mounting plate comprises a recess for receiving the Bluetooth antenna. In use the flying lead may pass through an opening in the door and the antenna may locate in the recess. The antenna may be secured in the recess. In this way the antenna may be mounted on an opposite side of the door to the lock assembly in use. The recess may open towards a surface of the door in use. The mounting plate may comprise a groove connected to the recess for receiving part of the flying lead.

The lock assembly may comprise a radio-frequency (RF) window aperture to allow radio-frequency signals to pass into and/or out of the housing. Preferably the window aperture is closed by a window panel comprising a radiotransparent material. Preferably the window panel substantially seals the RF window aperture to prevent ingress of fluids.

Preferably a radio-frequency sensor is disposed in or aligned with the radio-frequency window aperture. Preferably the sensor comprises a flexible sheet sensor.

Preferably the housing is generally frustoconical. In other embodiments, the housing may be generally cylindrical, trumpet shaped, or hemispherical. The housing need not have a radially symmetrical shape. For example, the housing could be generally rectangular, but with a curved upper surface which provides the arcuate portion of the housing.

In some embodiments, a cross-sectional profile of the housing may be generally polygonal (e.g. rectangular, pentagonal, hexagonal, octagonal).

Preferably a base of the keypad is mounted within the housing and keys of the keypad protrude through key apertures provided in the housing.

Preferably the door lock assembly comprises a key lock mechanism configured to manually operate a lock bolt of the electronic door lock.

The door lock assembly may comprise an auxiliary operating mechanism which is arranged, in use, to locate on an opposite side of the door relative to the housing. The electronic door lock module may comprise the auxiliary operating mechanism. Accordingly the door lock assembly may comprise the auxiliary operating mechanism. The auxiliary operating mechanism may be arranged to locate on an internal surface of the door and the housing is arranged to locate on an external side of the door. The auxiliary operating mechanism may be arranged to operate the lock bolt and may move the lock bolt between a locked position and an unlocked position. The auxiliary operating mechanism may comprise a thumb turn mechanism.

The electronic door lock module may comprise communication means to receive remote operational signals to lock and unlock the door. The electronic door lock module may comprise communication means to receive remote operational signals to move the lock bolt between a locked position and an unlocked position.

The communication means may comprise an antenna. The antenna may be located on a distal end of a flying lead. The proximal end of the flying lead may communicate with a control module. The control module may be located within the housing. The antenna may be located external of the housing. The housing may be arranged to locate on a first side of a door and the antenna may locate on or in or adjacent to a second opposite side of the door.

Preferably the door lock assembly comprises the lock bolt.

Preferably the door lock assembly comprises the electronic door lock module. The electronic door lock module may comprise a motor to move a lock bolt between a locked position and an unlocked position.

Also provided is a door comprising a door lock assembly according to the first aspect of the invention.

According to a second aspect of the invention there is provided a method of installing on a door a door lock assembly for operating an electronic door lock module to lock and unlock the door, the door lock assembly comprising:

- a housing extending along a central longitudinal axis from a first end to a second end, the housing comprising a peripheral wall which extends from the first end to the second end and is radially spaced around the central longitudinal axis;
- an interface configured to connect the door lock assembly to the electronic door lock module for operating a lock bolt;
- a primary locking arrangement for locking and unlocking the door, the primary locking arrangement comprising a keypad for inputting information to operate the electronic door lock;
- a secondary locking arrangement for locking and unlocking the door; and
- a Bluetooth antenna;
- wherein at least a portion of the peripheral wall is arcuate and curves around the central longitudinal axis of the housing, and wherein the keypad is provided on the peripheral wall and curves around the central longitudinal axis of the housing; the method comprising:
- securing the lock assembly to the door on a first side of the door opposite to a second side of the door on which the electronic door lock module is configured to be mounted; and securing the Bluetooth antenna on a second side of the door opposite to the first side.

Preferably the Bluetooth antenna is mounted on a flying lead and the method comprises passing the flying lead through an opening in the door.

The method may comprise removing an existing door lock assembly from the door prior to installing the door lock assembly on the door. In this the door lock assembly of the present invention may be retrofitted to a door.

BRIEF DESCRIPTION OF THE DRAWINGS

Embodiments of the present invention will now be described by way of example only with reference to the accompanying drawings, in which like reference numerals indicate like features and in which.

DESCRIPTION OF THE PREFERRED EMBODIMENTS

The present invention provides a door lock assembly for mounting to a door. The door lock assembly is arranged to connect to an electronic door lock and to operate the electronic door lock.

The (door) lock assembly or escutcheon assembly of the present invention is intended to be used with an electronic (e.g. motorised) door lock fitted to a door. The lock assembly is configured to be connected to the electronic door lock to cause the electronic door lock to lock or unlock a lock bolt or deadbolt of the electronic door lock. In this way, the lock assembly is arranged to operate the electronic door lock to lock or unlock the door. The lock assembly comprises a primary locking arrangement comprising a keypad. The lock assembly therefore may be referred to as a keycode lock or combination lock.

The lock apparatus described herein is intended to be mounted to a door in use. Accordingly, in this description, the terms "upwardly", "upper" and related terms refer to a direction away from gravity in use (e.g. towards the top in FIGS. 1 to 3). The terms "downwardly", "lower" and related terms refer to an opposite direction (e.g. towards the bottom in FIGS. 1 to 3). It will be appreciated however, that the lock assembly may be used in substantially any orientation.

Figure 1:
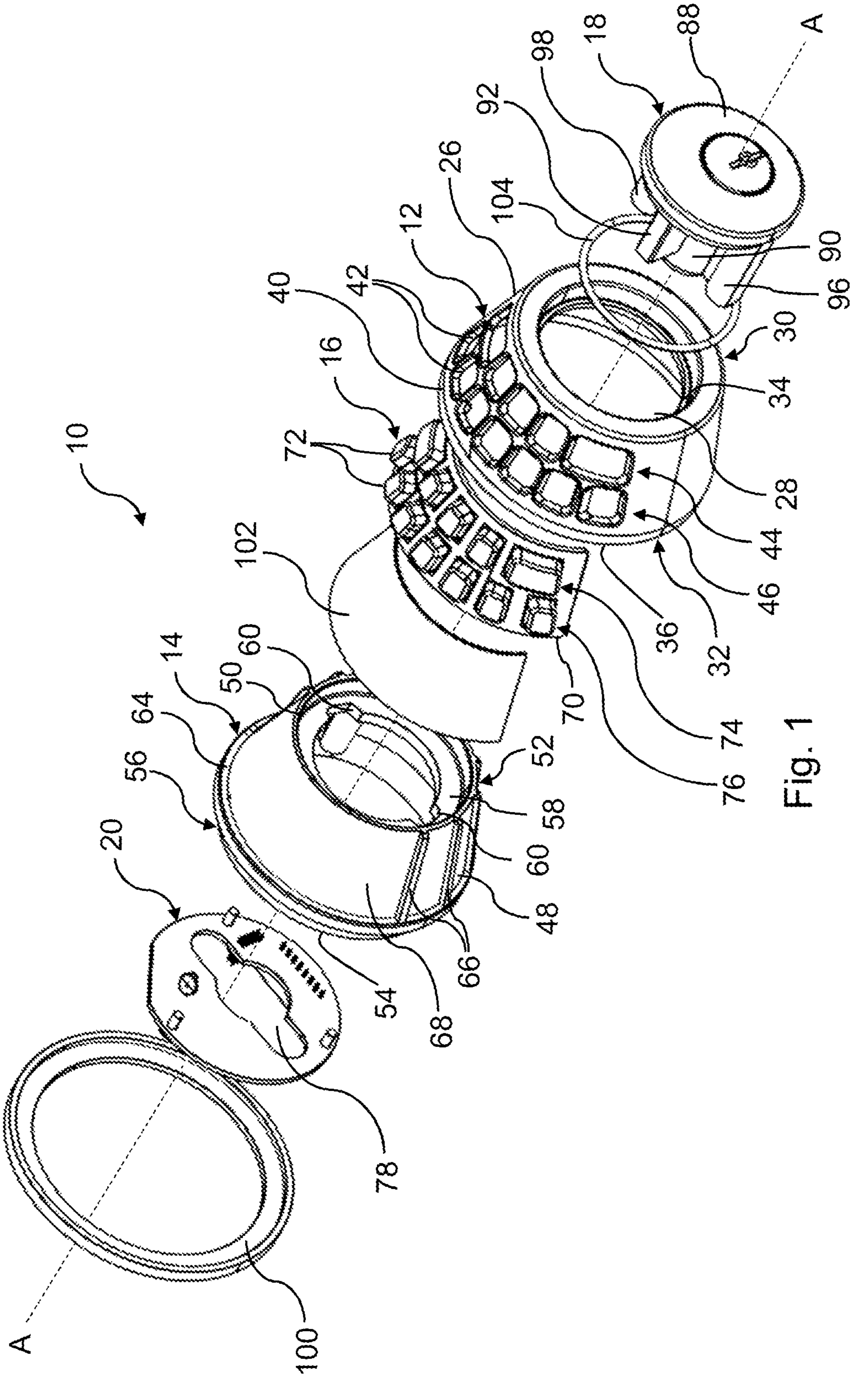
FIG. 1 is a perspective exploded view of a lock assembly according to a preferred embodiment of the present invention.

FIGS. 1 to 6 show a lock assembly 10 according to a first preferred embodiment of the invention. Referring in particular to FIG. 1, the lock assembly 10 comprises a housing or casing 12, a body 14, a keypad 16, a lock module 18, and a lock circuit board 20. The lock assembly 10 has a first, front side 22 (which in this embodiment is a key side or user-facing side) and a second, rear side or door side 24 generally opposite the front side 22. In use, the rear side 24 abuts, or is disposed proximate a door (not shown) to which the lock assembly 10 may be mounted, and the front side 22 is distal to the door. The front side or key side 22 is the side from which a user may insert a key to operate to the lock assembly 10.

In this embodiment, the housing 12 has a generally tubular frustoconical shape and comprises a curved wall 26 which extends around a housing axis A. The housing 12 comprises a circular first end opening 28 at a first end 30 of the housing 12 (which in this embodiment corresponds to the front side 22 of the lock assembly 10). The diameter of the first opening 28 is sized to receive part of the lock module 18. At the first end 30 of the housing 12 part of the housing wall 26 extends radially inwards and returns towards an opposite second end 32 of the housing, before extending radially further inwards. In this way, an annular rib or shoulder 34 is provided on an inner side of the housing 12 adjacent the first opening 28. The shoulder 34 defines a reduced-diameter opening relative to the first opening 28.

The housing 12 comprises a circular second end opening 36 at the second end 32 of the housing 12 which is disposed proximate the rear, door side 24 of the lock assembly 10. The second end opening 36 has a larger diameter than the first circular opening 28. An outer diameter of the housing 12 at the second end 32 is greater than an outer diameter at the first end 30. Accordingly, the housing 12 is tapered from the second end 32 towards the first end 30. In this embodiment, the housing axis A is also an axis A of the lock assembly 10. The interior of the housing 12 has a generally frustoconical shape. In this embodiment, the housing 12 is made from metal. For example, the housing 12 may be die-cast.

An upper side 40 of the housing 12 is provided with a plurality of key apertures 42. The key apertures 42 extend through the curved wall 26 of the housing 12. In this embodiment, two rows 44, 46 of key apertures 42 are provided, each row 44, 46 comprising a plurality of key apertures 42 and each row extending circumferentially part way around the housing 12. The two rows 44, 46 extend substantially parallel to one another. A first row 44 of the key apertures 42 is located adjacent the first end 30 of the housing 12 and a second row 46 of the key apertures 42 is located adjacent the second end 32 of the housing 12. In this embodiment, each key aperture 42 is generally trapezium shaped. A shorter side of each trapezium shape is disposed towards the first, smaller-diameter end 30 of the housing 12 and a longer side of the trapezium shape is disposed towards the larger-diameter second end 32 of the housing 12. With this arrangement, a width of each key aperture 42 increases in a direction towards the second end 32 of the housing 12. Accordingly, the width of each key aperture 42 is tapered to match the tapered shape of the housing 12.

The body 14 has a generally tubular frustoconical shape. This shape is provided by a curved body wall 48 which extends around the axis A. The body 14 is sized to fit in the interior of the housing 12. A curvature of the body 14 matches the curvature of the housing 12. The body 14 comprises a first circular opening 50 at a first end 52 of the body and a second circular opening 54 at a second end 56 of the body 14. The first and second ends 52, 56 of the body 14 are disposed proximate the key side 22 and the door side 24, respectively, of the lock assembly 10. The second circular opening 54 has a larger diameter than the first circular opening 50. An internal circumferential rib 58 is provided on an inner side of the body 14 adjacent the first end opening. The rib 58 provides a shoulder defining a reduced-diameter opening proximate the first circular opening 50. A pair of generally opposed guide slots 60 is provided in the rib 58. Each guide slot 60 extends through the rib 58 in a direction parallel to the axis A. Each guide slot 60 is sized to receive part of the lock module 18, as described further below. In this embodiment, the body 14 (or inner casting) comprises a cast body, which may for example be made from metal, or a plastics material.

Figure 2:
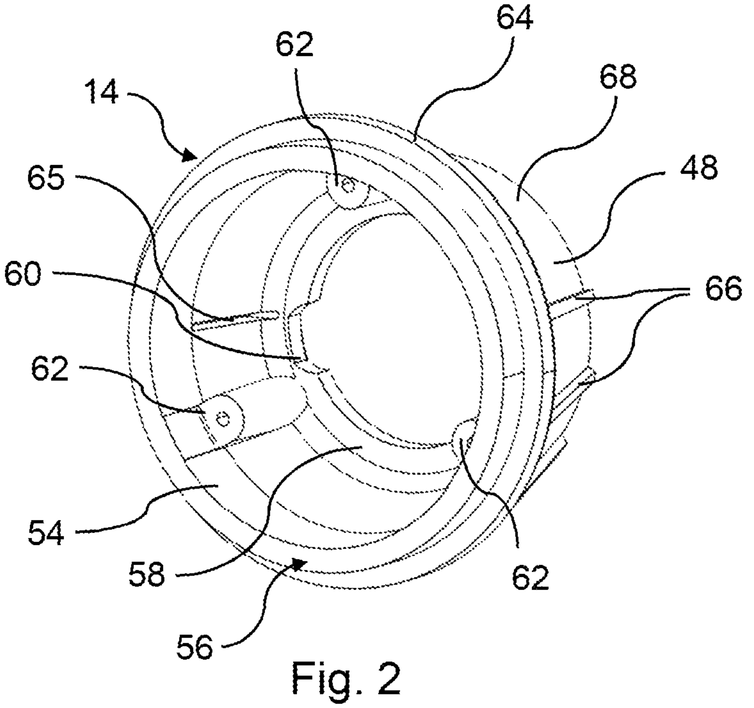
FIG. 2 is a perspective view of part of the lock assembly of FIG. 1.
Figure 3:
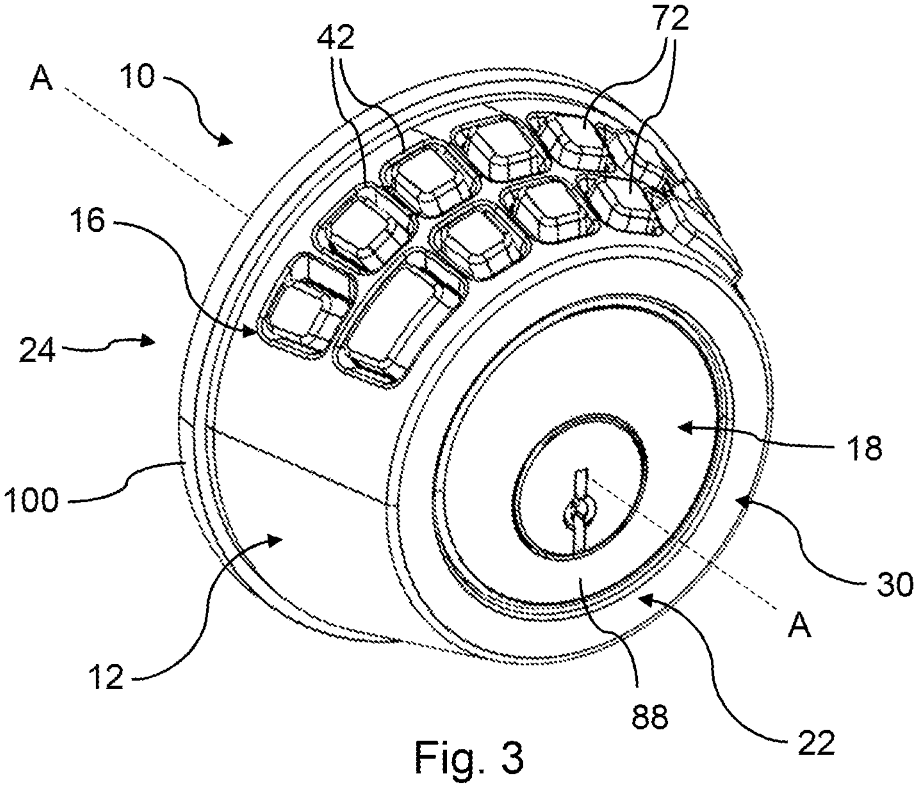
FIG. 3 is a front perspective view of the lock assembly of FIG. 1.

With reference to FIG. 2, the body 14 comprises a plurality of stop members 62 provided on an inner circumferential surface of the body 14. Each stop member extends from the rib 58, part way towards the second end 56 of the body 14. Each stop member 62 protrudes radially inward to provide a stop proximate the second opening 54. In this embodiment, three stop members 62 are equi-angularly spaced around the inner circumference of the body 14. Each stop member 62 has a bore which opens towards the second end 56 of the body 14, for receiving a fastener.

An annular flange 64 is provided on an outer side of the body wall 48 adjacent the second end 56 of the body 14. The flange 64 is spaced apart from the second end 56 of the body 14. A lower portion of the body 14 is provided with circumferentially-spaced ribs 66. The ribs 66 extend longitudinally along the body wall 48 from the flange 64 to the first end 52 of the body 14. An upper portion of the body wall 48 is free from ribs. In this way, the upper portion extends circumferentially between the uppermost ribs 66 on generally opposite sides of the body 14. The upper portion provides a curved upper surface 68. One of the uppermost ribs 66, proximate the curbed upper surface 68 comprises a cutaway or relieved portion. Between the cutaway and the adjacent rib, an access slot or cable slot 65 passes through the body wall 48.

The keypad 16 comprises a base 70 and a plurality of keys or buttons 72. The base 70 is generally rectangular. Long side edges of the base 70 are curved so that the base 70 is curved around the axis A. In this way, a lower surface of the base 70 is curved to match the curvature of the curved upper surface 68 of the body 14. In this way, the keypad 16 is curved to match a curvature of the housing 12 and body 14. A thickness of the base 70 is sized to fit between the body 14 and the housing 12. The keypad 16 may be flexible in order to match the curvature of the body 14 and/or housing 12.

The plurality of keys 72 is provided on the base 70. In some embodiments, the keys 72 and base 70 may be integrally formed, for example from a sheet of an elastomeric material. The keys 72 are arranged in two rows 74, 76, each row comprising a plurality of keys. The two rows 74, 76 extend substantially parallel to one another. Each key 72 is arranged to register with, and extend through, a respective key aperture 42 in the housing 12. Each row 74, 76 of keys 72 is arranged to align with a respective row 44, 46 of key apertures 42.

A first row 74 of keys is located adjacent the first end 30 of the housing 12 and a second row 76 is located adjacent the second end 32 of the housing 12. The rows 74, 76 extend generally parallel to one another around the axis A. In this embodiment, each of the plurality of keys 72 is generally trapezium shaped. A shorter side of each trapezium shape is disposed towards the first, smaller-diameter end 30 of the housing 12 and a longer side of the trapezium shape is disposed towards the larger-diameter second end 32 of the housing 12. With this arrangement, a width of each key 72 increases in a direction towards the second end 32 of the housing 12. Accordingly, the width of each key 72 is tapered to match the tapered shape of the housing 12.

The lock circuit board or main circuit board 20, which in this embodiment is a printed circuit board (PCB), is generally circular. A diameter of the lock PCB 20 is sized to fit in the second end opening of the body. The lock PCB 20 comprises a central aperture in the form of an elongate slot 78. A middle portion of the slot 78 has a greater width than lateral portions of the slot 78. In this way, the slot 78 has a shape similar to a ‘euro-slot’ shape.

Figure 4:
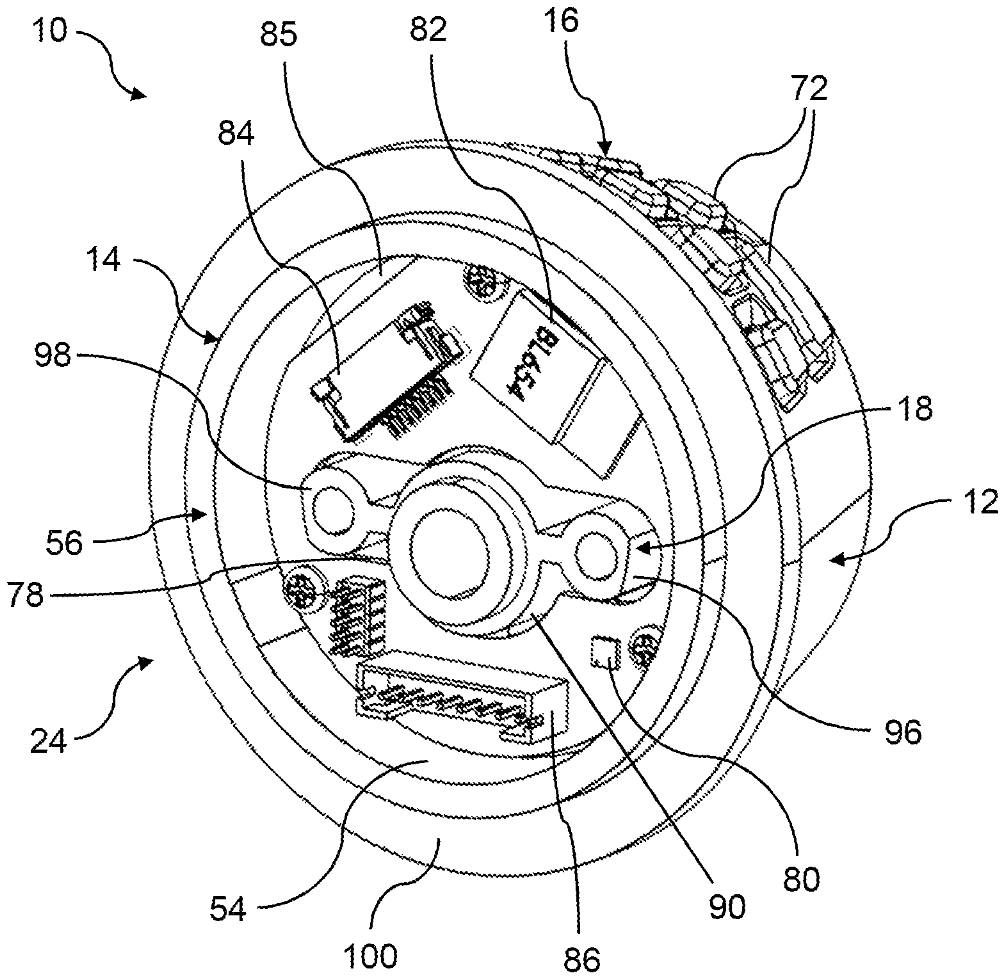
FIG. 4 is a rear perspective view of the lock assembly of FIG. 1.

The lock PCB 20 comprises circuitry and components for operating an electronic door lock. The circuitry and components are configured such that when the lock assembly 10 is connected to an electronic door lock, the keypad 16 can be used to operate the electronic door lock to lock and unlock a door. In particular, the lock PCB 20 comprises a processing module 80 (which may comprise a microchip or microprocessor), a Bluetooth module 82, and first and second electrical connectors 84, 86, as can be seen in FIG. 4.

The processing module 80 is configured to process signals from the keypad 16 and to transmit signals to the electronic door lock via the second electrical connector 86. The Bluetooth module 82 is configured to provide connectivity so that the lock assembly 10 may form part of a home automation system or home security system. For example, the Bluetooth module 82 may be configured to connect a central hub of the home automation system or home security system, and/or to a remote device such as a smartphone or tablet. Accordingly, the lock assembly 10 is configured to be operated remotely, to actuate the electronic door lock. For example, the lock assembly 10 may be operated remotely by a user via a smartphone application, or via a central hub of a home automation system, to lock or unlock the electronic door lock (for example, without operating the keypad 16). In this embodiment, the lock assembly 10 comprises a Bluetooth antenna (not shown in FIGS. 1 to 6. The Bluetooth antenna is connected to the lock assembly 10 (for example to the PCB 20 and/or Bluetooth module 82) by a length of flexible wire (which may be known as a flying lead).

In this embodiment, the lock module 18 (which provides a secondary locking arrangement for locking and unlocking the door) comprises a key lock module comprising a key lock mechanism (not shown). The lock module 18 comprises a first end plate (key plate) 88 and a lock body or lock cylinder 90. The first end plate 88 is disc shaped and is sized to fit in the first end opening 28. The lock cylinder 90 extends from a face of the first end plate 88. The lock cylinder 90 is generally cylindrical and houses the key lock mechanism.

Figure 5:
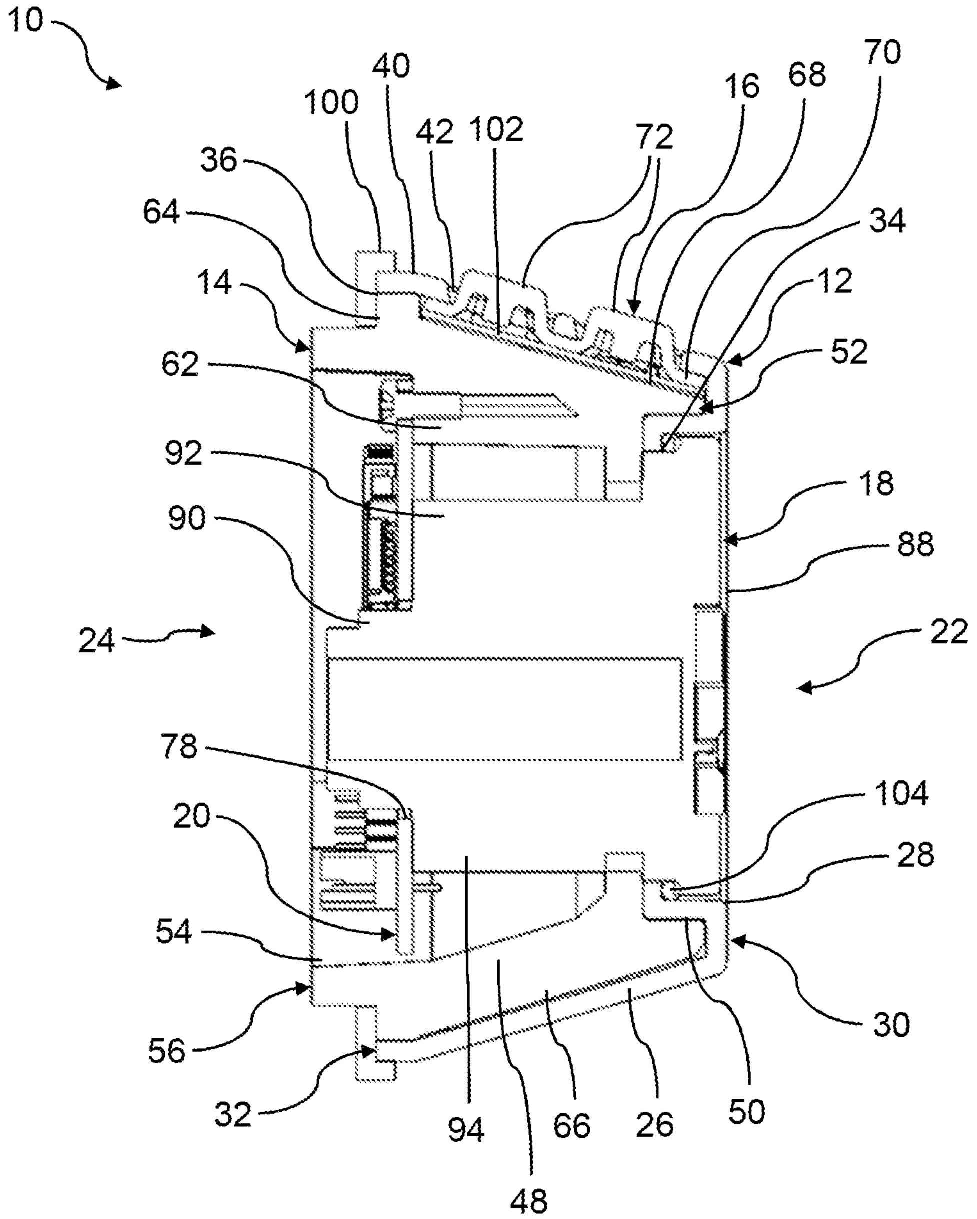
FIG. 5 is a cross-sectional side view of the lock assembly of FIG. 1.

The lock module 18 comprises opposing upper and lower abutment members 92, 94 disposed on opposite upper and lower sides of the lock cylinder 90. The lower abutment member is not visible in FIG. 1. Referring in particular to FIG. 5, each of the first and second abutment members 92, 94 extends along the lock cylinder 90 from the first end plate 88 part way towards a second end 95 of the lock cylinder 90 furthest from the first end plate 88. The upper abutment member 92 extends radially upward from the lock cylinder 90 and the lower abutment member 94 extends radially downward from the lock cylinder 90. In some embodiments, only the upper or lower abutment member is provided. Each abutment member 92, 94 is arranged to abut part of the lock PCB 20, as described further below.

Figure 6:
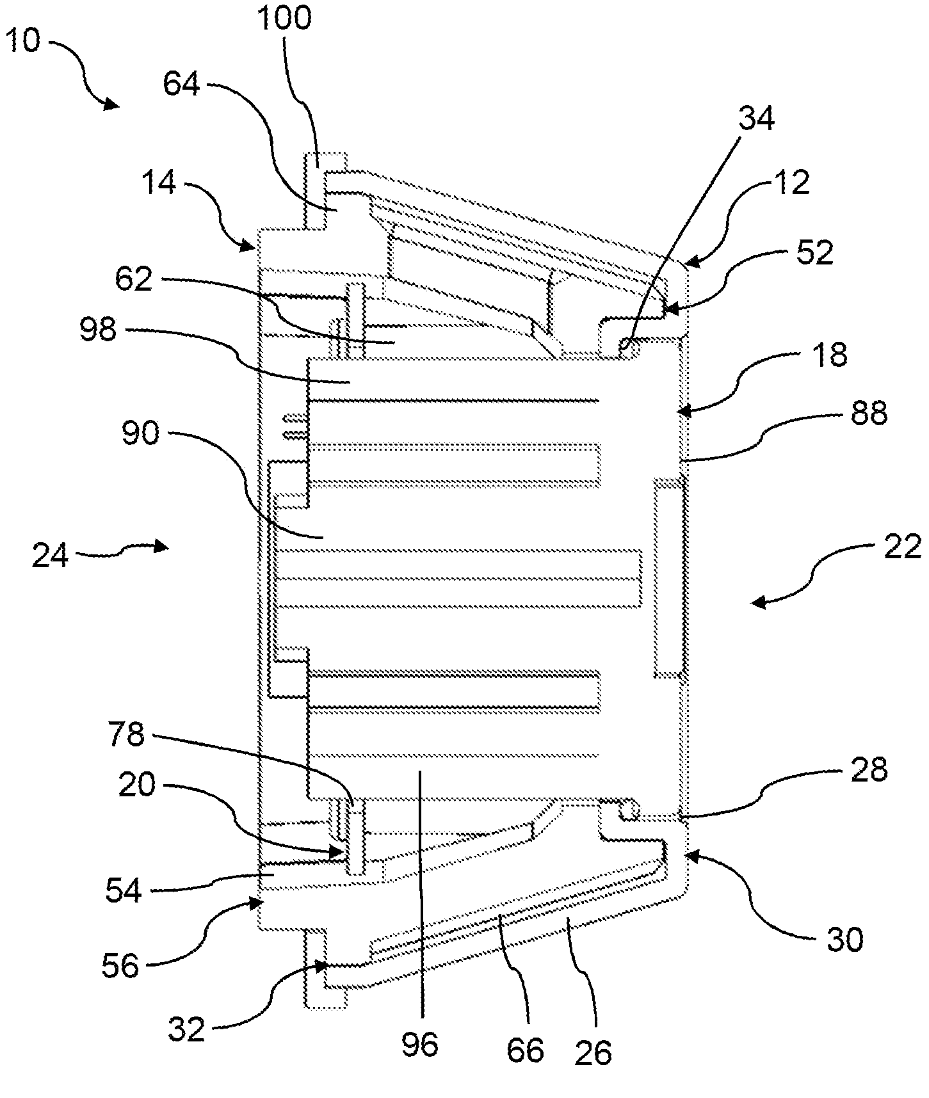
FIG. 6 is a cross-sectional top view of the lock assembly of FIG. 1.
Figure 7:
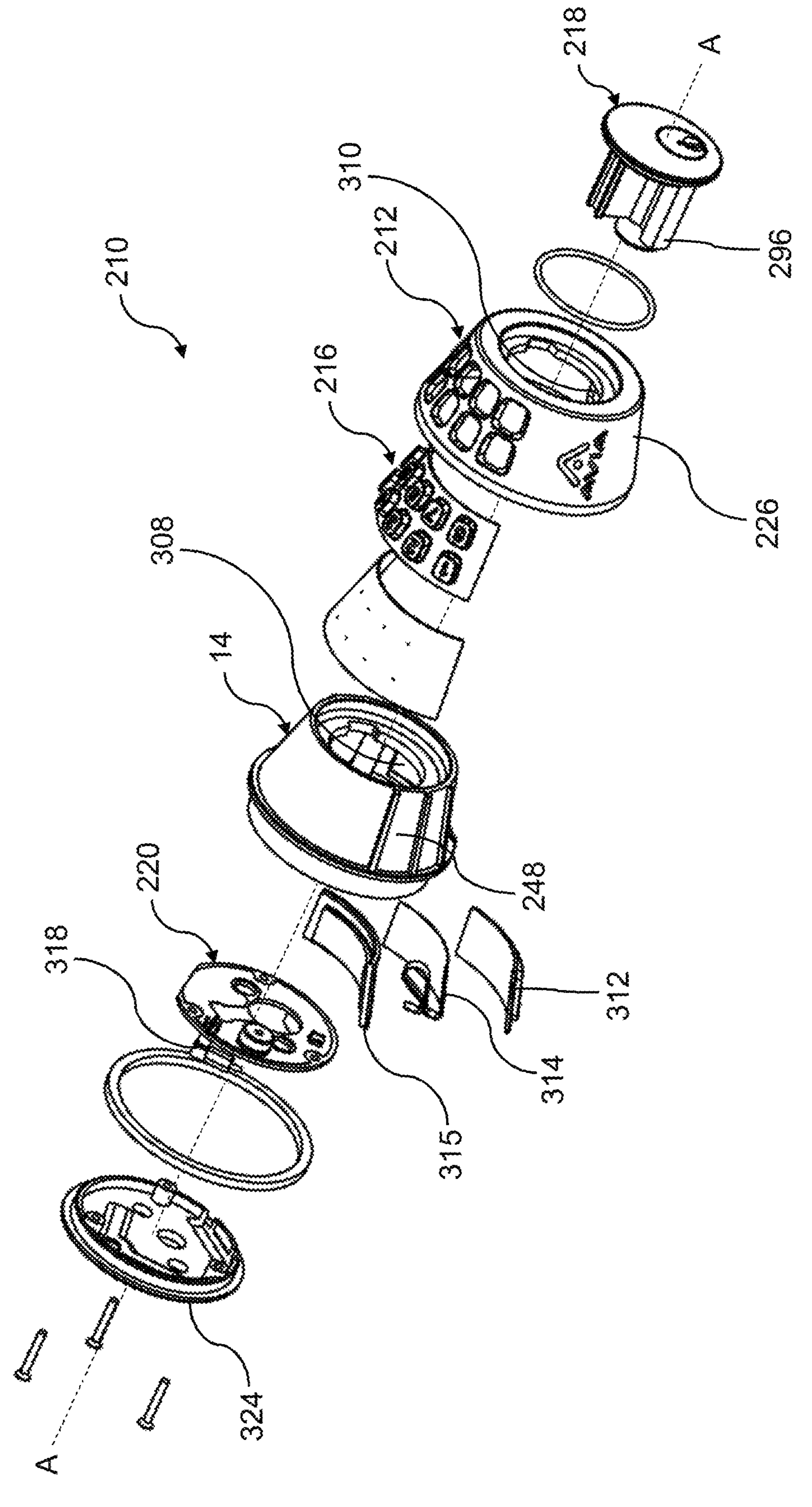
FIG. 7 is a perspective exploded view of a lock assembly according to another preferred embodiment of the invention.

The lock module 18 further comprises securing members. With reference to FIG. 6, first and second lateral securing members 96, 98 extend from the first end plate 88 towards the second end 95 of the lock cylinder 90 on opposite lateral sides of the lock cylinder 90. Each lateral securing member 96, 98 is generally tubular and extends parallel to the lock cylinder 90. Each lateral securing member 96, 98 comprises a bore which opens towards the second end 95 of the lock cylinder 90 and which is arranged to receive a fastener. The lateral securing members 96, 98 are disposed on opposite lateral sides of the lock cylinder 90. Each lateral securing member 96, 98 is connected to the lock cylinder 90 by a web or wall which extends between the cylindrical lock cylinder 90 and a respective securing member 96, 98. The lateral securing members 96, 98 extend further towards the second end 95 of the lock cylinder 90 than the abutment members 92, 94. Each lateral securing member 96, 98 is sized to fit in a respective one of the lateral portions of the slot 78 in the lock PCB 20, as described further below. Each lateral securing member 96, 98 is sized to fit in a respective one of the guide slots 60 in the body 14.

As can be seen most clearly in FIGS. 5 and 6, when the lock assembly 10 is assembled, the body 14 is disposed in the interior of the housing 12. The body 14 is inserted into the housing 12 from the second end 36 of the housing 12 so that the first end 52 of the body 14 is disposed proximate the first end 30 of the housing 12. The body 14 is coaxially arranged with the housing 12. The rib 58 proximate the first end 52 of the body 14 abuts the shoulder 34 proximate the first end 30 of the housing 12. An annular first end portion of the body 14 inserts between an inner side of the housing wall 26 and the return portion proximate the first end 30. The annular flange 64 proximate the second end 56 of the body 14 is located in the second end opening 36 of the housing 12. A generally annular sealing gasket 100 extends around the body 14 proximate the second end 56 of the body 14. The sealing gasket 100 abuts the annular flange 64 and the second end 56 of the housing 12 so as to provide a seal where the annular flange 64 fits in the second end opening. In use, the sealing gasket 100 may be sandwiched between the flange 64 and a surface of the door.

The ribs 66 provided on the lower portion of the body 14 abut an inner surface of the housing 12. Accordingly, the housing wall 26 is spaced apart from the body wall 48 by the ribs 66. In this way, a circumferential space is defined between the body wall 48 and the inner surface of the housing 12.

The lock PCB 20 is located in the second end opening 54 of the body 14. The lock PCB 20 abuts the stop members 62 and is secured to the stop members 62 by fasteners which pass through the lock PCB 20 and into the bore of a respective stop member 62.

The keypad 16 is disposed on an upper side of the lock assembly 10. The keypad 16 is located such that the base 70 of the keypad 16 is disposed in the space between the body 14 and the housing 12. In particular, the base 70 extends over the curved upper surface 68 of the body 14. The keypad 16 is therefore curved around the axis A. Each row 74, 76 of keys 72 extends circumferentially part way around the housing 12. Each key 72 registers with and protrudes through a respective key aperture. In this way the keypad 16 is coextensive with part of the housing 12. The keys 72 protrude generally radially from the housing 12, so that the keys 72 are pressed and released in a direction radially with respect to the axis A. In this way, the keypad 16 is easily accessible and readable by a user. The keys 72 may be pressed in a more natural direction by a user, which matches the curvature of the user's hand.

With this arrangement, a plane of the keypad 16 faces radially outward from the housing axis. The keypad 16 faces upwards and forwards (away from the door in use), which helps to improve visibility to the user and provides a comfortable angle at which to use the keypad 16, whilst reducing visibility of the keypad 16 to other persons (e.g. onlookers) further away from the door. In prior art systems, where a plane of the keypad is typically parallel to a plane of the door, the keypad may be more visible to potential intruders. It will be appreciated that in the present invention, the keypad 16 need not face generally upwards, but could face generally laterally (e.g. towards a side of the door) or generally downwards.

A keypad circuit board 102, which may be a flexible PCB, is disposed between the curved upper surface 68 and the base 70 of the keypad 16. The keypad PCB 102 is arranged to receive electrical signals generated by operating the keypad 16. The keypad PCB 102 is electrically connected to the lock PCB 20 so that the keypad 16 is configured to operate the electronic door lock via the lock PCB 20. The keypad PCB 102 may be connected to the lock PCB by a suitable cable or other connecting element such as a ribbon cable (not shown) via the cable slot 65. In this embodiment, the keypad PCB 102 is connected to the first electrical connector 84. As can be seen in FIGS. 1 and 4, a segment of the generally circular main PCB adjacent to the first electrical connector 84 is absent (e.g. cut away) to provide a gap 85 between an edge of the PCB 20 and the inner surface of the body 14. With this arrangement, the gap 85 provides space for a cable or other connecting means to connect the keypad PCB to the first electrical connector 84, via the cable slot 65.

Part of the lock module 18 is received in the body 14. In this way, the lock module is located in the housing 12. The lock module 18 is located such that the first end plate 88 is disposed in the first end opening 28 of the housing 12 and the lock cylinder 90 extends through the tubular body 14. The first end plate 88 is located in the first end opening 28 and abuts the shoulder 34 provided in the housing 12 proximate the first end opening 28. A sealing O-ring 104 is provided between the first end plate 88 and the shoulder 34. Each lateral securing member 96, 98 extends through a respective guide slot 60 in the body 14. In this way, the lock module 18 is secured to the body 14 and the body 14 is prevented from rotating with respect to the lock module 18.

The lock module 18 is secured to the door and/or to part of a door lock (e.g. the electronic door lock) by fasteners (not shown), each of which is received in a respective bore of one of the securing members 96, 98. In this way the key lock mechanism can be operated with a key to rotate a lock spindle (not shown) without the entire lock module rotating 18.

An end portion of the lock cylinder 90 registers with and extends through the enlarged middle portion of the slot 78 in the PCB 20. In this way the lock cylinder 90 is arranged to engage with a locking spindle of the electronic door lock (not shown) so that the key lock mechanism can be used manually to lock or unlock the door. Each lateral securing member 96, 98 registers with and extends through a respective lateral portion of the slot 78. Each of the upper and lower abutment members 92, 94 abuts the PCB 20. With this arrangement, the PCB 20 is mounted within the body 14 to help keep the lock assembly 10 compact. The PCB 20 is supported by abutment with the abutment members 92, 94.

In use, the lock assembly 10 is mounted to a door (not shown) with the door side 24 of the lock assembly 10 facing the door. The lock assembly 10 is connected to the electronic door lock. The lock cylinder 90 is engaged with a lock spindle (not shown) of the electronic door lock so that a lock bolt of the electronic door lock can be operated manually using a key inserted into the lock cylinder 90.

The second electrical connector 86 is arranged to connect to a corresponding electrical connector (not shown) of the electronic door lock. In this way, the second electrical connector 86 provides an interface between the lock assembly and the electronic door lock. Accordingly, the electronic door lock can be operated by using the keypad 16 to key in a code. The processing module 80 may determine whether a correct code has been entered, and cause electrical signals to be transmitted to the electronic door lock to lock or unlock the electronic door lock.

Since the Bluetooth antenna is mounted on a flying lead, when the lock assembly 10 is mounted to a door, the Bluetooth antenna can be mounted in a position which improves Bluetooth signal strength. Because the Bluetooth module 82 is mounted on the lock PCB 20, which is located within the housing 12, wireless signals from the Bluetooth module 82 may be partially blocked by the housing 12, body 14, or another structure. Advantageously, the Bluetooth antenna can be mounted in a part of the door, or in part of the electronic door lock (e.g. on an opposite side of the door to the lock assembly) so that adequate signal strength is provided. For example, where the lock assembly 10 is mounted on an external side of the door, the Bluetooth antenna may be mounted on an internal side of the door, for example to provide adequate wireless signal strength inside a building.

FIGS. 7 to 19 show a lock assembly 210 according to a second preferred embodiment of the invention. The lock assembly 210 is similar to the lock assembly 10 of the first embodiment, and only differences will be described in detail. Features of the lock assembly 210 of this second embodiment in FIGS. 7 to 19 that correspond to features of the lock assembly of the first embodiment in FIGS. 1 to 6 are indicated by reference numerals incremented by 200.

Figure 8:
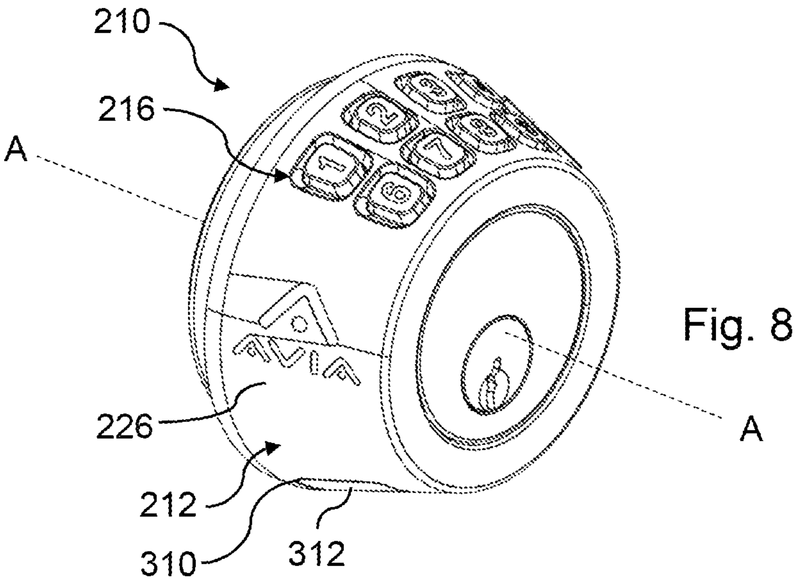
FIG. 8 is a front perspective view of the lock assembly of FIG. 7.

The lock assembly 210 comprises a housing 212 having a generally tubular frustoconical shape and comprising a curved wall 226 which extends around a housing axis A'. The lock assembly 210 also comprises a body 214 having a generally tubular frustoconical shape and comprising a curved wall 248 which extends around the housing axis A'. The housing 212, body 214 and keypad 216 are substantially the same as the housing 12 and body 14 of the lock assembly 10 of the first embodiment described above, except that a radio frequency (RF) window aperture 306 is provided in a lower portion of the lock assembly 210, as seen most clearly in FIGS. 8, 9 and 10. The RF window aperture 306 extends between an interior of the body 214 and an exterior of the lock assembly 210. The RF window aperture 306 comprises a generally trapezium shaped aperture which passes through a lower wall of the housing 212 and through a lower wall of the body 214, as can be seen in FIG. 8. Accordingly, the RF window aperture 306 comprises a first aperture 308 which passes through the body wall 248 and a second aperture 310 which passes through the housing wall 226. The first aperture 308 is aligned with the second aperture 310. The RF window aperture 306 is arranged to allow passage of radio-frequency signals or other wireless signals between the interior of the housing 214 and the environment external to the lock assembly 210. Such signals might otherwise be blocked or attenuated by the housing and/or body walls 226, 248, in particular when one or both of these parts comprises metal. In this way, the lock assembly 210 may receive remote signals.

The second aperture 310 is closed by a RF window panel or cover 312, which is shaped to fill the second aperture 310. The RF window panel 312 is made from a material which is substantially transparent to radio signals (e.g. radiotransparent), such as a plastics material. The RF window panel 312 may substantially seal the second aperture 310, for example to help prevent ingress of dust or fluids. The RF window 308 is generally trapezium shaped and is curved to match the curvature of the housing 212. In this embodiment, the window panel 312 comprises a plug portion 313 which fits in the second aperture 310, and a peripheral flange 316 extending around the plug portion. The flange 316 is arranged to extend over an inner surface of the housing 212 around the second aperture 310 to secure the RF window panel 312 in the second aperture 310 and to help seal the second aperture 310.

Figure 9:
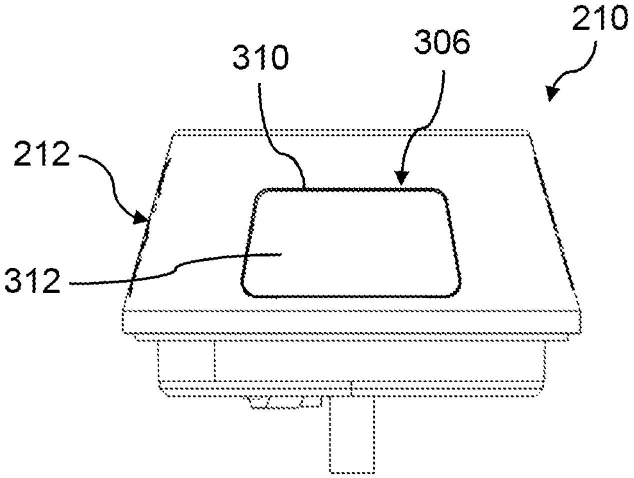
FIG. 9 is a lower side view of the lock assembly of FIG. 7.
Figure 10:
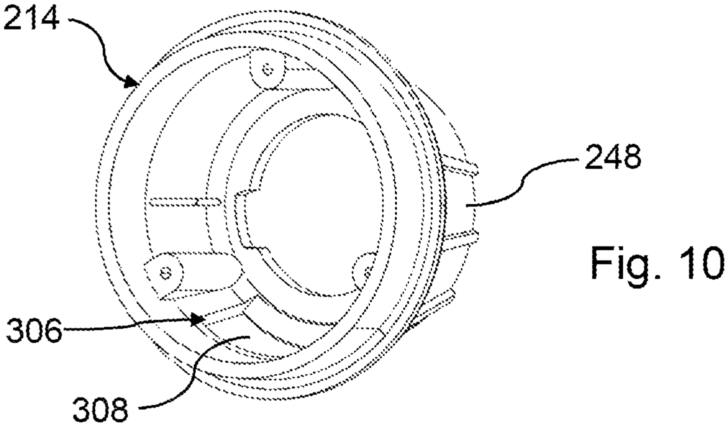
FIG. 10 is a rear perspective view of part of the lock assembly of FIG. 7.

The first aperture 308, defined in the body 214, which can be seen most clearly in FIG. 9, is arranged to accommodate a sensor 314 of the lock assembly 210. The sensor 314 is arranged to detect RF signals. In this embodiment the sensor 314 comprises a flexible sheet which is generally trapezium shaped and is sized to fit in the first aperture 308. The sensor 314 is mounted on a moulding 315 which fits in the first aperture 308. In this way the sensor 314 is aligned with the first aperture 306. The sensor 314 is disposed between the moulding 315 and the window panel 312. A curvature of the sensor 314 is arranged to match the curvature of the housing wall 248. The sensor 314 is connected to the main PCB 220 by a flexible lead or ribbon connector (not shown). With this arrangement, the sensor is arranged to receive remote signals so that the lock assembly 210 can be controlled remotely in order to operate (e.g. lock and unlock) an electronic door lock.

Figure 11:
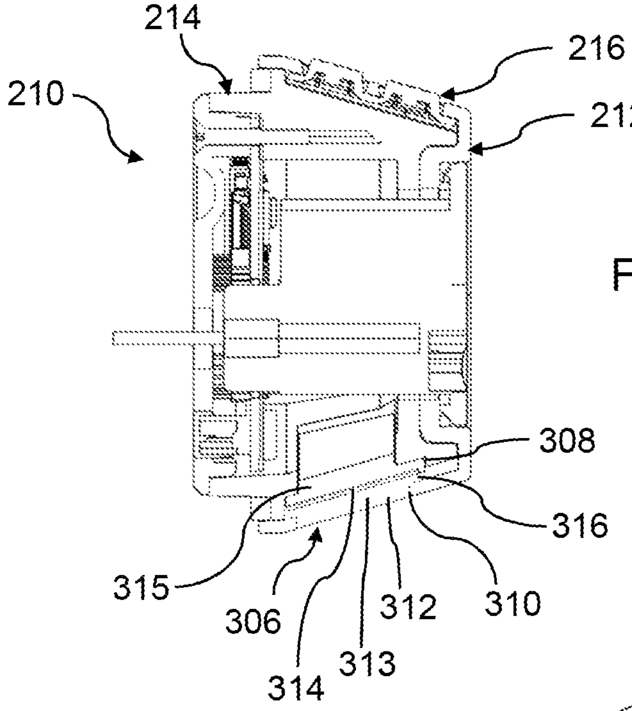
FIG. 11 is cross-sectional side view of the lock assembly of FIG. 7.
Figure 12:
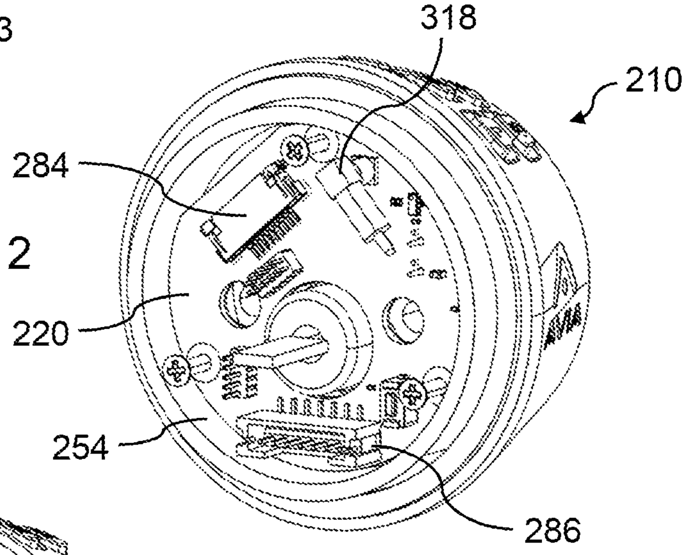
FIG. 12 is a rear perspective view of the lock assembly of FIG. 7 with a rear cover removed.
Figure 13:
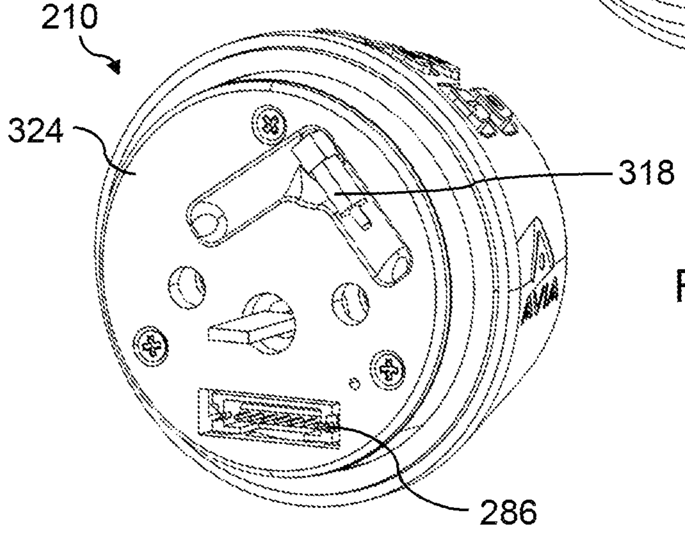
FIG. 13 is a rear perspective view of the lock assembly of FIG. 7.
Figure 14:
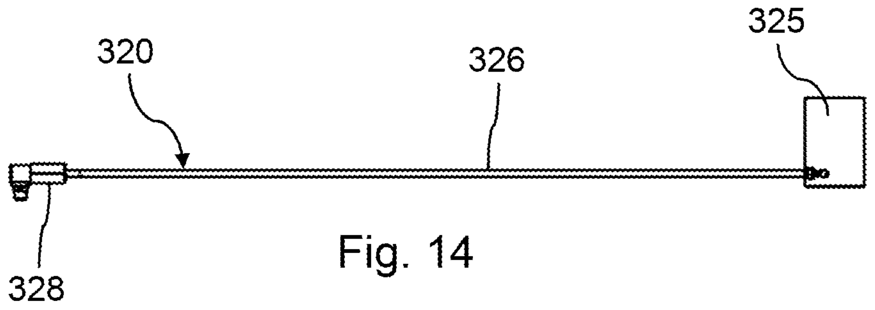
FIG. 14 shows an antenna assembly of the lock assembly of FIG. 7.

Referring also to FIGS. 11 and 12, the lock assembly 210 comprises first and second electrical connectors 284, 286 mounted on the PCB 220, which are arranged to be connected to the keypad PCB and the electronic door lock, respectively. In this embodiment, the lock assembly 210 further comprises a first Bluetooth antenna connector 318 mounted on the PCB 220, which in this example comprises a right-angled micro-miniature coaxial (MMCX) plug. The first antenna connector 318 is arranged to be connected to a Bluetooth antenna assembly 320 of the lock assembly 210. The antenna assembly 320 is arranged to improve Bluetooth wireless signal strength, as explained further below. For simplicity, the antenna assembly is not shown in FIGS. 7 to 12.

The lock assembly 210 comprises a generally circular rear cover or plate 324 arranged to close a second (rear) circular opening 254 of the housing 214, thus covering a rear side of the PCB 220. The first antenna connector 318 extends through an opening in the rear cover 324 and is partly recessed into a groove in a rear side of the rear cover 324.

In this embodiment, the Bluetooth antenna assembly 320 (seen most clearly in FIG. 14) comprises a Bluetooth antenna 325, a flying lead 326 and a second antenna connector 328. The flying lead comprises a length of electrical cable (such as coaxial cable) which extends between the second antenna connector 328 at a proximal end of the antenna assembly 320 and the Bluetooth antenna 325 at a distal end of the antenna assembly 320. The antenna assembly 320 is arranged to be connected to the PCB 220 via the first antenna connector 318. Accordingly, the second antenna connector 328 comprises a MMCX socket configured to engage and form an electrical connection with the MMCX plug 318. With this arrangement, the proximal end of the antenna assembly 320 is secured or fixed with respect to the housing 212 in use. The distal end of the antenna assembly 320 comprising the antenna 325 is a free end which can be moved and positioned with respect to the housing 212, whilst remaining tethered to the housing by the flying lead 326. In this way the antenna 325 can be positioned so as to improve Bluetooth signal transmission and/reception in a desired location.

The flying lead 326 is arranged to extend away from the housing so that the antenna 325 may be located outside, and spaced apart from, the housing 212. In this way the antenna 325 may be located to provide wireless signal transmission and/or reception in a desired location. By locating the antenna 325 external to the body 214 and housing 212, wireless signal strength is improve compared to if the antenna were mounted in the interior of the housing 212 or body 214. For example, when the lock assembly 210 is installed on a door (not shown), the flying lead 326 may pass through an opening in part of the door so that the antenna 315 may be located on an opposite side of the door to the lock assembly, to improve signal strength on the opposite side of the door, as described further below. In some embodiments, the lock assembly comprises a buzzer mounted on the main PCB, which may be configured to produce a sound when the keys of the keypad are pushed and/or when the lock assembly receives remote signals and/or when the lock assembly operates to lock or unlock a door lock.

Figure 15:
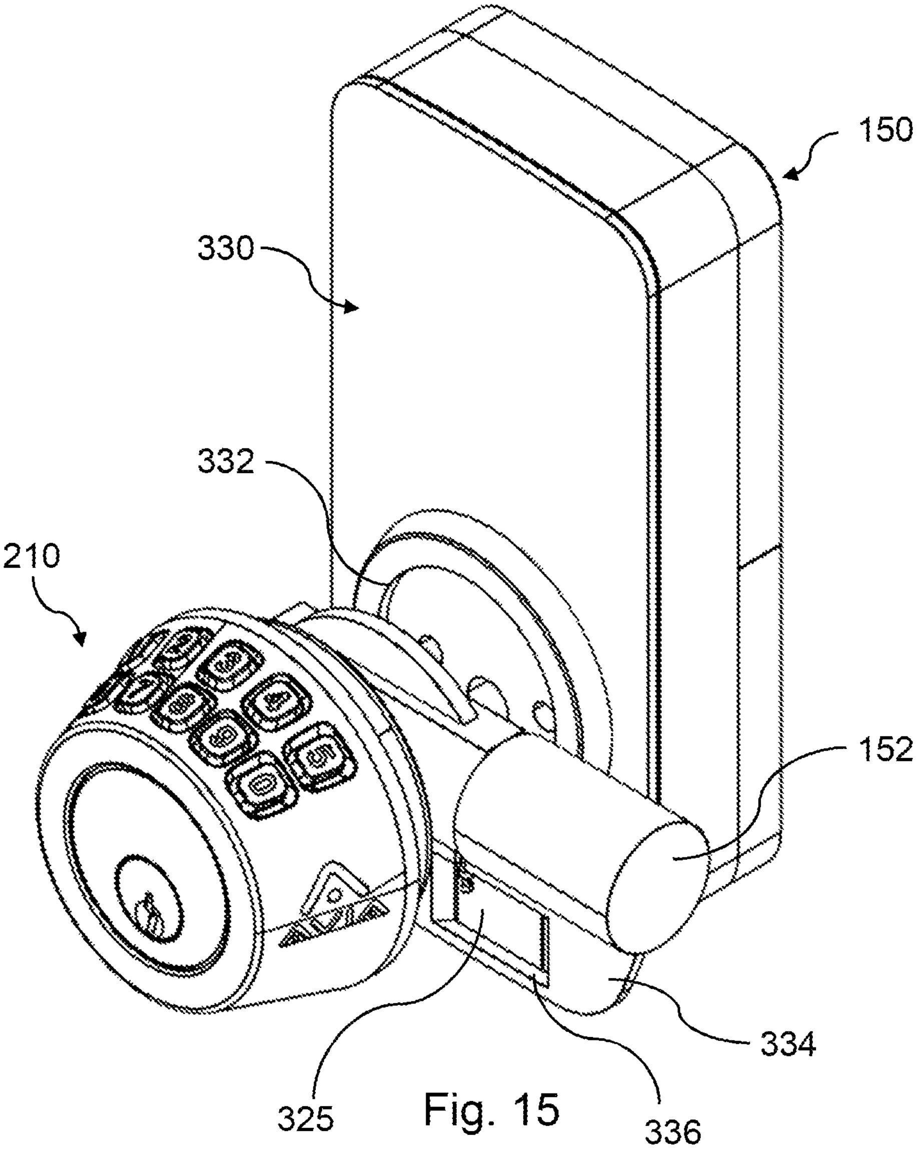
FIGS. 15, 16 and 17 show the lock assembly of FIG. 7, together with a lock bolt, a mounting plate and an electronic door lock with which the lock assembly may be used.
Figure 16:
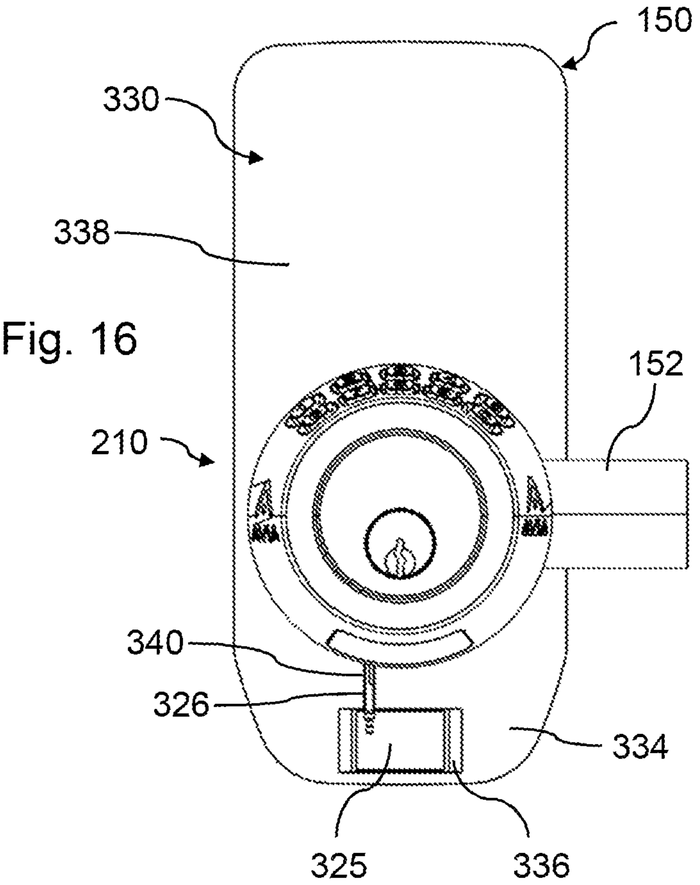
Figure 17:
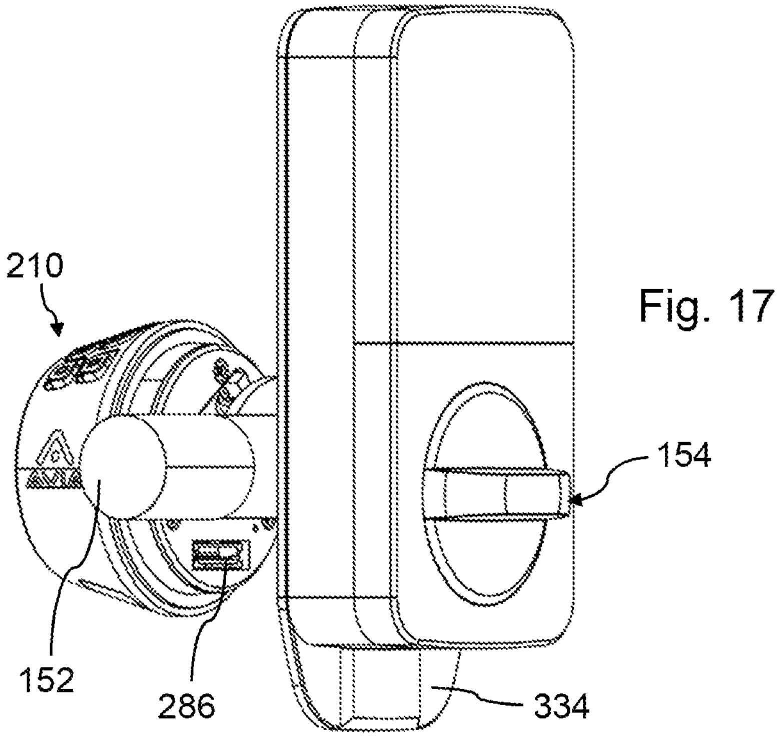

The lock assembly of the present invention may be used with existing internal door lock mechanisms. FIGS. 15, 16 and 17 show the lock assembly 210 together with a door lock 150 with which the lock assembly 210 may be used. The door lock 150 provides an auxiliary operating mechanism which is arranged to operate a lock bolt 152 and may move the lock 152 between a locked position and an unlocked position. The door lock 150 comprises an electronic door lock and also a thumb turn mechanism 154 to allow the door lock to be operated manually to lock or unlock the lock bolt 152.

The door lock 150 is arranged in use, to locate on an opposite side of the door (not shown) relative to the housing 12 of the lock assembly 10. The electronic door lock 150 may be arranged to locate on an internal surface of a door, with the housing 12 arranged to locate on an external side of the door. In this way, the proximal end of the antenna assembly 320 may be located on the external side of the door (e.g. exterior to a building or room) and the distal end of the assembly 320 comprising the antenna 325 may be located on an internal side of the door (e.g. in the interior of a building or room). With this arrangement, Bluetooth signal strength may be improved inside a building, for example to improve reliability of a wireless connection of the lock assembly 210 to a home automation system and/or to a remote device such as a smartphone.

Figure 18:
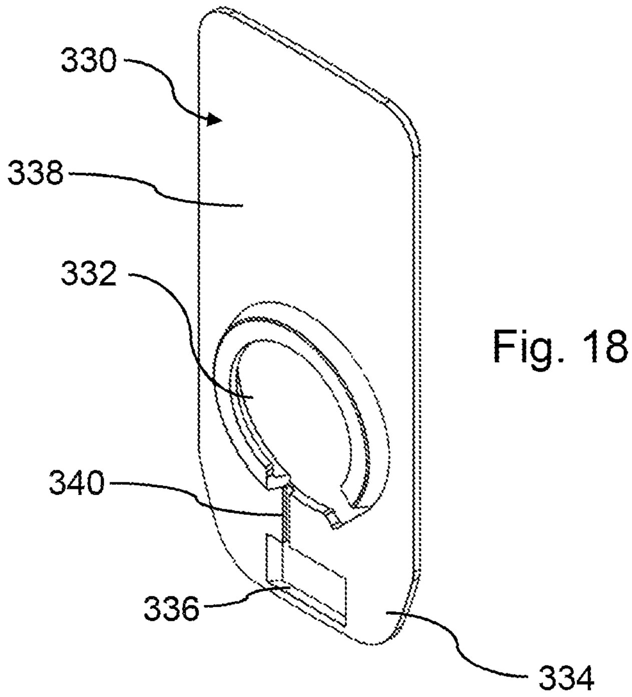
FIGS. 18, 19 and 20 show views of the mounting plate alone.
Figure 19:
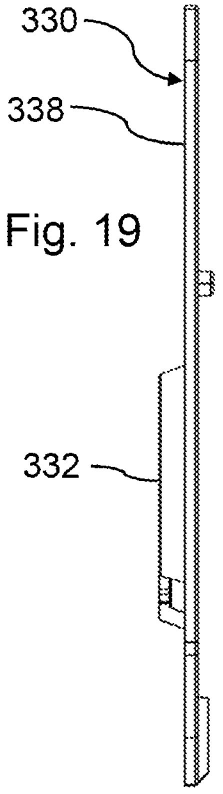
Figure 20:
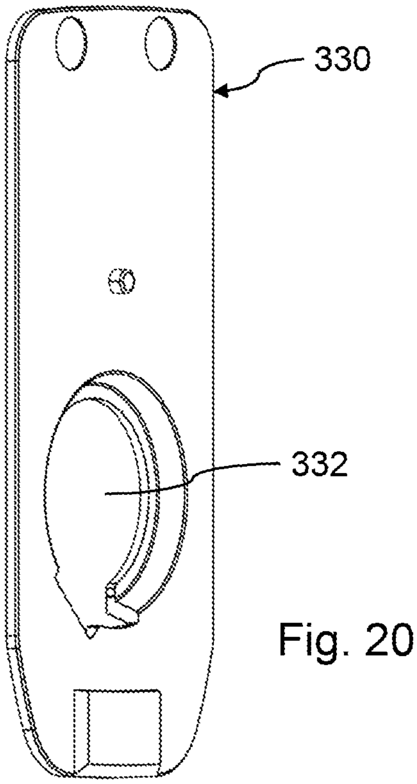

In this embodiment, a mounting plate 330 is provided to locate on a side of the existing internal door lock 150 between the door lock 150 and the door. Referring also to FIGS. 17, 18 and 19, the plate 330 comprises a generally circular aperture 332 through which part of a lock mechanism (not shown) of the door lock mechanism 150 extends in use. In this embodiment, a lower end portion 334 of the plate 330 is arranged to extend downwardly beyond the door lock 150, as can be seen most clearly in FIGS. 14 and 16. The lower end portion 334 of the plate 330 comprises a recess 336 which opens on a rear side 338 of the plate 330. The rear side 338 faces and/or contacts the door in use. The recess 336 is sized to accommodate the Bluetooth antenna 325. A groove 340 recessed into the rear side 338 of the plate 330 extends vertically between the recess 336 and the aperture 332 and is sized to accommodate part of the flying lead 326. At least the part of the plate in which the recess is formed is made from a radiotransparent material to allow passage of signals to and from the antenna 325. The plate may comprise a moulded plastics material.

In use, the lock assembly 210 and electronic door lock 150 are fitted to opposite sides of a door, at opposite ends of an opening or bore passing through the door. A locking spindle (not shown) extends between the lock module of the lock assembly 210 and a lock mechanism of the electronic door lock. The spindle is arranged to operate the lock bolt 152. Fasteners such as screws or bolts (not shown) extend between the lock assembly 210 and the door lock 150 to secure the lock assembly 210 and door lock to the door. For example, fasteners may be received in bores in securing members 296, 298, of the lock module 218. The plate 330 is located between the door lock 150 and the door.

The flying lead 326 is threaded through the opening in the door so that the antenna 325 may be located in the recess 336. Part of the flying lead extends in the groove 340. The antenna 325 may be secured in the recess, for example with a suitable adhesive. When the lock assembly 210 and electronic door lock 150 are secured together, the door is clamped between them, and the recess 336 is closed by a surface of the door. In this way, the plate 330 is adapted to shroud and conceal the internally mounted Bluetooth antenna 320.

The lock assembly 210 is electrically connected to the electronic door lock 150 by a cable (not shown) which is routed through the opening in the door and extends between and connects the second electrical connector 286 and a corresponding electrical connector of the electronic door lock 150. With this arrangement, the electronic door lock 150 may be operated to lock or unlock the bolt 152, by operation of the keypad 216, a key lock mechanism of the lock assembly 210, and/or by receipt of remote signals by the lock assembly 210 (e.g. via the antenna assembly 320). It will be appreciated that the plate 330 and door lock 150 may also be used with the lock assembly 10 of the first embodiment.

With the arrangements described above, the lock assembly of the present invention is particularly compact. Because the keypad is shaped to curve around the housing axis A and is coextensive with the curved wall of the housing, the lock assembly has generally the same size and shape as a widely used 'standard' mechanical lock assembly (which may be known as an escutcheon or escutcheon lock). Accordingly, the lock assembly of the present invention may have generally the same footprint and/or overall appearance as pre-existing lock assemblies. In this way, the lock assembly of the present invention can be retrofitted to a door, for example to replace a pre-existing solely mechanical lock assembly.

The lock assembly of the present invention may have substantially the same footprint on the door as an existing solely mechanical lock assembly. Accordingly, in some embodiments, additional fixings or modifications to the door may not be required to install the lock assembly. Since the keypad is integrated with the lock assembly housing (which may be made from metal) the lock assembly is more secure and may be more difficult to break into compared to prior art lock assemblies in which the keypad is provided on a dedicated or standalone housing. Also, a keypad operated lock assembly may be provided without an increase in size or footprint relative to a pre-existing lock assembly. The keypad is less visible when viewing the door, which may also deter potential intruders. Having the keypad facing radially outward may make it more difficult for an onlooker to determine a keypad code by watching a user type in the code. Moreover, the lock assembly may be aesthetically more desirable, as a separate housing or additional housing part is not required for the keypad.

The invention claimed is:

1. A door lock assembly for operating an electronic door lock module to lock and unlock a door, the door lock assembly comprising:

a housing extending along a central longitudinal axis from a first end to a second end, the housing comprising a peripheral wall which extends from the first end to the second end and is radially spaced around the central longitudinal axis;

an interface configured to connect the door lock assembly to the electronic door lock module for operating a lock bolt;

a primary locking arrangement for locking and unlocking the door, the primary locking arrangement comprising a keypad for inputting information to operate the electronic door lock;

a secondary locking arrangement for locking and unlocking the door; and a Bluetooth antenna assembly, wherein:

at least a portion of the peripheral wall is arcuate and curves around the central longitudinal axis of the housing, the keypad is provided on the peripheral wall and curves around the central longitudinal axis of the housing, and the Bluetooth antenna assembly comprises a flying lead and a Bluetooth antenna, the flying lead extends between a control module of the lock assembly and the Bluetooth antenna, a proximal end of the Bluetooth antenna assembly is fixed with respect to the housing, a distal end of the Bluetooth antenna assembly comprising the Bluetooth antenna is moveable with respect to the housing to enable the Bluetooth antenna to be located outside the housing, and the flying lead is configured to be capable of extending through an opening in a door such that, in use, the housing and the proximal end of the flying lead are located on a first side of the door and the antenna is located on a second, opposite side of the door.

2. A door lock assembly according to claim 1, in which the keypad is provided on an upper side of the housing.

3. A door lock assembly according to claim 1, in which the keypad faces generally upward in use.

4. A door lock assembly according to claim 1, in which the keypad extends around an upper part of the circumference of the peripheral wall.

5. A door lock assembly according to claim 1, in which the arcuate portion of the peripheral wall comprises an arcuate surface which curves around the central longitudinal axis.

6. A door lock assembly according to claim 5, in which a plane of the keypad is coextensive with at least part of the arcuate surface.

7. A door lock assembly according to claim 1, in which the keypad comprises a plurality of keys which are arranged to extend radially around the central longitudinal axis.

8. A door lock assembly according to claim 1, in which the housing has a generally frustoconical shape.

9. A door lock assembly according to claim 1, in which the first end of the housing is arranged, in use, to locate adjacent to a surface of a door.

10. A door lock assembly according to claim 9, in which the housing is arranged, in use, to protrude away from the door and the protruding housing enables a user to place a palm of their hand over the second end of the housing and for their fingers to operate the keypad.

11. A door lock assembly according to claim 1, in which the secondary locking mechanism comprises a key lock mechanism.

12. A door lock assembly according to claim 11, in which the key lock mechanism comprises a cylinder lock.

13. A door lock assembly according to claim 1, comprising a mounting plate arranged to locate between the door and the electronic door lock on an opposite side of the door to the lock assembly in use.

14. A door lock assembly according to claim 13, in which the mounting plate comprises a recess for receiving the Bluetooth antenna.

15. A door lock assembly according to claim 1, comprising a radio-frequency window aperture to allow radio-frequency signals to pass into and out of the housing.

16. A door lock assembly according to claim 15, in which the radio-frequency window aperture is closed by a window panel comprising a radiotransparent material and the window panel substantially seals the radio-frequency window aperture to prevent ingress of fluids.

17. A door lock assembly according to claim 1, wherein the door lock assembly comprises the electronic door lock and the lock bolt.

18. A door comprising a door lock assembly according to claim 1.

19. A method of installing on a door a door lock assembly for operating an electronic door lock module to lock and unlock the door, the door lock assembly comprising:

a housing extending along a central longitudinal axis from a first end to a second end, the housing comprising a peripheral wall which extends from the first end to the second end and is radially spaced around the central longitudinal axis;

an interface configured to connect the door lock assembly to the electronic door lock module for operating a lock bolt;

a primary locking arrangement for locking and unlocking the door, the primary locking arrangement comprising a keypad for inputting information to operate the electronic door lock;

a secondary locking arrangement for locking and unlocking the door; and a Bluetooth antenna assembly, the Bluetooth antenna assembly comprising a flying lead and a Bluetooth antenna, the flying lead extending between a control module of the lock assembly and the Bluetooth antenna, a proximal end of the Bluetooth antenna assembly fixed with respect to the housing, a distal end of the Bluetooth antenna assembly comprising the Bluetooth antenna is moveable with respect to the housing to enable the Bluetooth antenna to be located outside the housing, and the flying lead is configured to be capable of extending through an opening in the door;

wherein at least a portion of the peripheral wall is arcuate and curves around the central longitudinal axis of the housing, and wherein the keypad is provided on the peripheral wall and curves around the central longitudinal axis of the housing;

the method comprising:

securing the lock assembly to the door on a first side of the door opposite to a second side of the door on which the electronic door lock module is configured to be mounted; and securing the Bluetooth antenna on a second side of the door opposite to the first side.

20. The method of claim 19, wherein the Bluetooth antenna is mounted on a flying lead and the method comprises passing the flying lead through an opening in the door.

21. The method of claim 20, comprising removing an existing door lock assembly from the door prior to installing the door lock assembly on the door.

22. A door lock assembly for operating an electronic door lock module to lock and unlock a door, the door lock assembly comprising:

a housing extending along a central longitudinal axis from a first end to a second end, the housing comprising a peripheral wall which extends from the first end to the second end and is radially spaced around the central longitudinal axis;

an interface configured to connect the door lock assembly to the electronic door lock module for operating a lock bolt;

a primary locking arrangement for locking and unlocking the door, the primary locking arrangement comprising a keypad for inputting information to operate the electronic door lock;

a secondary locking arrangement for locking and unlocking the door; and a Bluetooth antenna connector, wherein:

at least a portion of the peripheral wall is arcuate and curves around the central longitudinal axis of the housing, the keypad is provided on the peripheral wall and curves around the central longitudinal axis of the housing, and the Bluetooth antenna connector comprises a socket which is configured to be connected to a Bluetooth antenna assembly that comprises a flying lead and a plug at a proximal end of the flying lead, such that the plug engages and forms an electrical connection with the socket.

23. A door lock assembly according to claim 22, in which the lock assembly further comprises a Bluetooth antenna assembly.

24. A door lock assembly according to claim 23, in which the Bluetooth antenna assembly comprises a flying lead and a Bluetooth antenna and in which the flying lead extends between a control module of the lock assembly and the Bluetooth antenna.

25. A door lock assembly according to claim 24, in which, a proximal end of the Bluetooth antenna assembly is fixed with respect to the housing and a distal end of the Bluetooth antenna assembly comprising the Bluetooth antenna is moveable with respect to the housing to enable the Bluetooth antenna to be located outside the housing.

26. A door lock assembly according to claim 24, in which the flying lead is configured to extend through an opening in the door such that, in use, the housing and the proximal end of the flying lead are located on a first side of the door and the antenna is located on a second, opposite side of the door.

27. A door lock assembly for operating an electronic door lock module to lock and unlock a door, the door lock assembly comprising:

a housing extending along a central longitudinal axis from a first end to a second end, the housing comprising a peripheral wall which extends from the first end to the second end and is radially spaced around the central longitudinal axis;

an interface configured to connect the door lock assembly to the electronic door lock module for operating a lock bolt;

a primary locking arrangement for locking and unlocking the door, the primary locking arrangement comprising a keypad for inputting information to operate the electronic door lock;

a secondary locking arrangement for locking and unlocking the door; and a mounting plate configured to be located between the door and the electronic door lock on an opposite side of the door to the lock assembly in use, wherein:

at least a portion of the peripheral wall is arcuate and curves around the central longitudinal axis of the housing, the keypad is provided on the peripheral wall and curves around the central longitudinal axis of the housing, and the mounting plate comprises a recess for receiving a Bluetooth antenna and a groove for receiving a flying lead.

* * * * *